United States Patent [19]

Pickett et al.

[11] Patent Number: 4,569,420
[45] Date of Patent: Feb. 11, 1986

[54] LUBRICATING METHOD AND SYSTEM FOR USE IN CABLE PULLING

[76] Inventors: Wiley J. Pickett, 620 N. Washington Ave., Moorestown, N.J. 08057; Albert A. Boye, 608 College Blvd., Wenonah, N.J. 08090

[21] Appl. No.: 696,857

[22] Filed: Jan. 30, 1985

Related U.S. Application Data

[63] Continuation of Ser. No. 449,267, Dec. 13, 1982, abandoned.

[51] Int. Cl.⁴ .............................................. F16N 9/00
[52] U.S. Cl. ............................. 184/15.1; 254/134.3 R; 254/134.3 FT
[58] Field of Search ................ 184/15.1; 254/134.3 R, 254/134.3 FT

[56]  References Cited

U.S. PATENT DOCUMENTS

| | | | |
|---|---|---|---|
| 2,735,794 | 2/1956 | Pletcher | 134/167 C X |
| 3,022,765 | 2/1962 | Xenis | 118/306 X |
| 3,633,629 | 1/1972 | Rider | 138/127 |
| 3,959,840 | 6/1976 | Sato | 134/167 C X |
| 4,108,279 | 8/1978 | Marcell | 184/15.1 |
| 4,123,133 | 10/1978 | Pickett et al. | 339/273 R |
| 4,275,096 | 6/1981 | Taylor | 184/15.1 X |
| 4,296,837 | 10/1981 | Charlton | 184/15.1 |

*Primary Examiner*—David H. Brown
*Attorney, Agent, or Firm*—Albert L. Free

[57] ABSTRACT

Lubrication is provided for the pulling of a cable through a conduit by providing one or more lubricant nozzles on a nozzle head secured to the leading end of the cable, so that while the cable is pulled through the conduit the lubricating material is sprayed outwardly onto the interior walls of the conduit ahead of the leading end of the cable being pulled.

3 Claims, 7 Drawing Figures

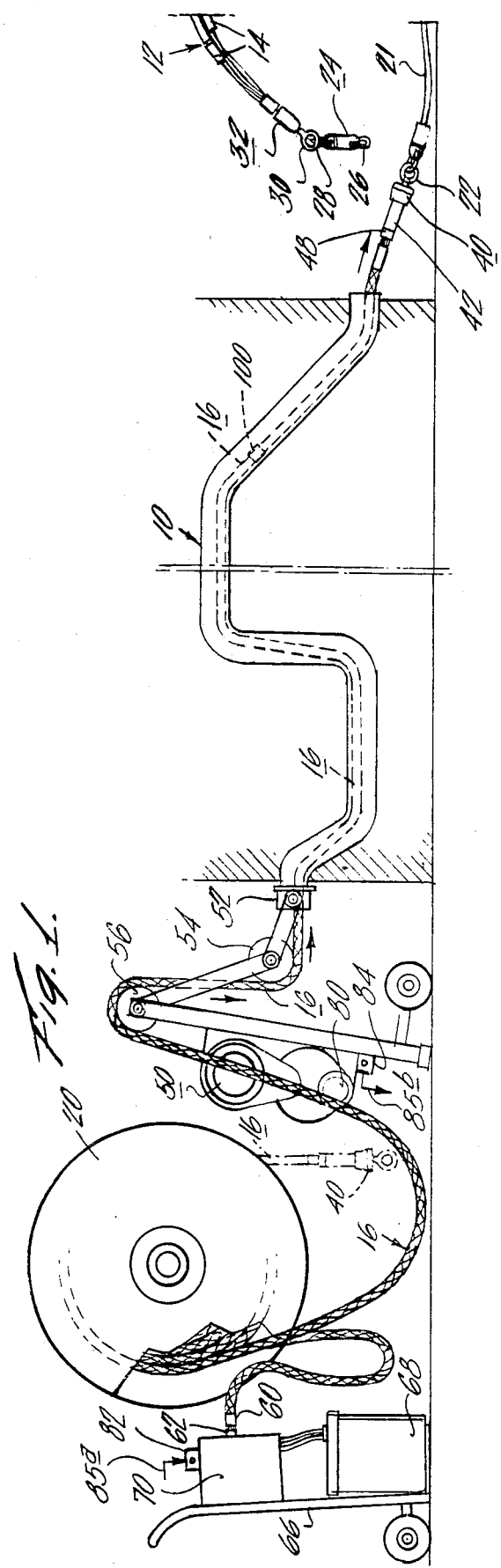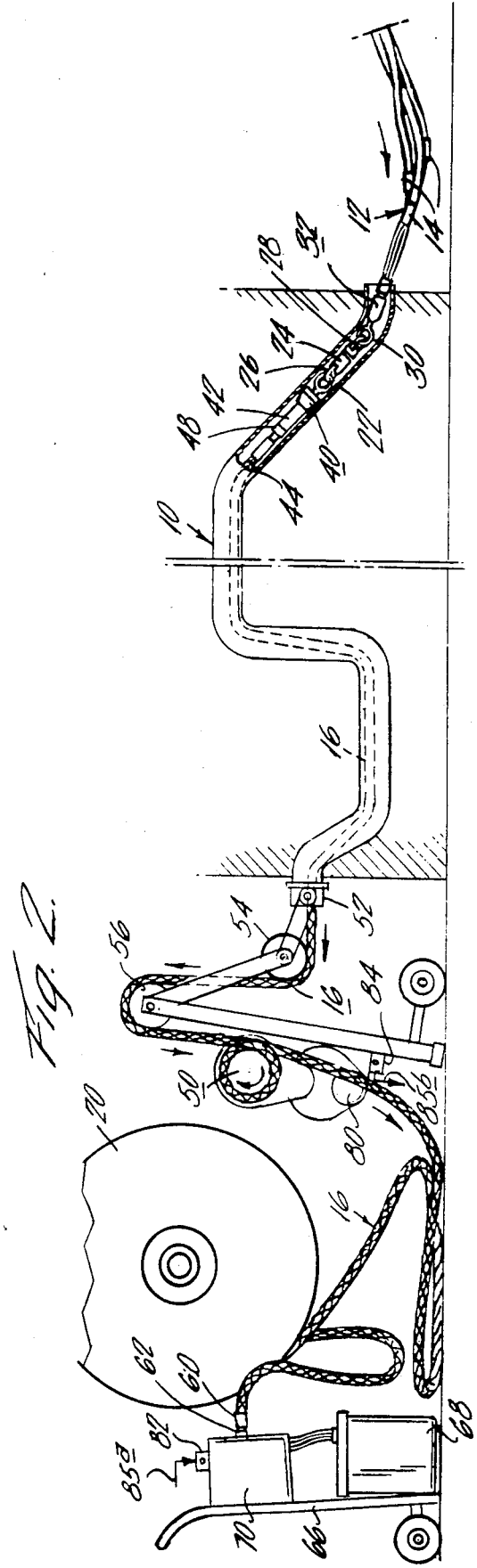

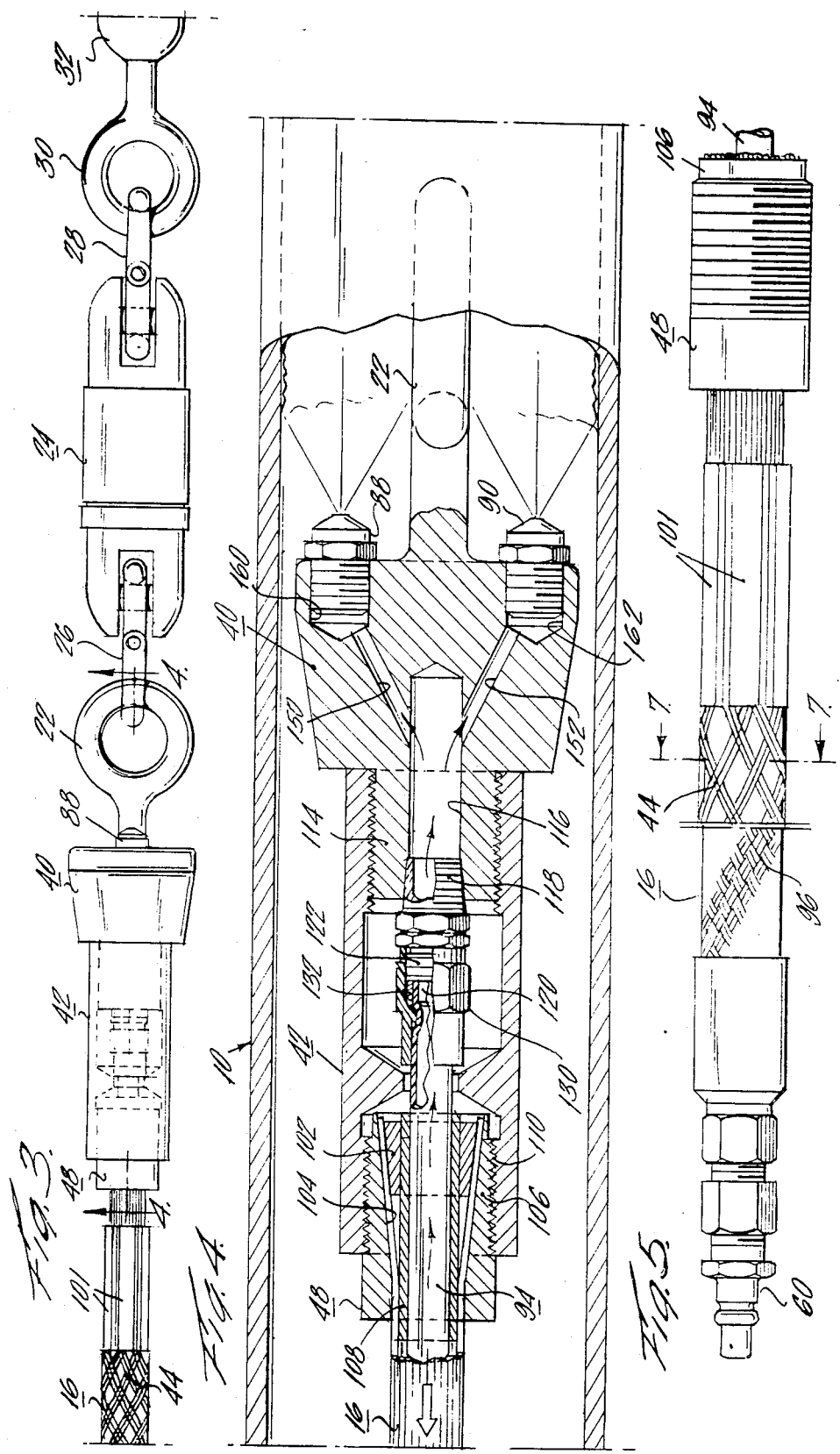

LUBRICATING METHOD AND SYSTEM FOR USE IN CABLE PULLING

This is a continuation of co-pending application Ser. No. 449,267, filed on Dec. 13, 1982, now abandoned.

BACKGROUND OF THE INVENTION

It is common, in the construction trades, to be required to pull relatively large electrical cables through conduits which are often not much larger in diameter than the cables, and which in general contain a number of relatively sharp bends. The difficulty in so doing can be greatly increased by friction between the exterior of the cable and the interior of the conduit as the cable is pulled through the conduit. To reduce this problem, it is known to apply lubricant to the exterior of the cable, for example by way of a collar which surrounds the cable and through which the cable is pulled just prior to its being pulled through the conduit. It is also known to scoop up lubricant and apply it to the exterior of the cable just prior to pulling. Also it is known that a plastic bag of gel-like lubricant can be slit and tied to the trailing end of a mandrel. As the bag is pulled through the conduit some of the gel is rather haphazardly squeezed onto the conduit in an attempt to pre-lubricate the conduit. Not only are these methods often untidy and difficult to use, but they are generally less effective than would be desired, particularly since the oil applied to the cable may be progressively wiped or drained away as the cable progresses through the conduit.

Undue frictional engagement between the cable and the conduit will commonly result in an excessively high tension in the pulling cable, with the danger of breakage thereof, as well as in the possibility of damage to the cable, the connections thereto, or the conduit itself.

The system and method of the present invention provides improved lubrication during the pulling of a cable through a conduit, controls the amount of lubrication making the pulling easier and more tidy, the tension in the pulling line smaller and the danger of damage to cable or conduit less, while reducing the overall cable pulling cost.

SUMMARY OF THE INVENTION

In accordance with the invention, lubrication for the pulling of a cable through a conduit by a pulling line connected to the cable by a pulling connection is provided by means of a spray nozzle means adjacent to and ahead of the pulling connection, to which spray nozzle means a fluid lubricant under pressure is supplied through a passage extending along the interior of the pulling line, the spray nozzle means being oriented to spray the lubricant outwardly and against the adjacent interior walls of the conduit as the cable is being pulled through the conduit.

Preferably the passage in the pulling line is provided by tubular means such as a tube of flexible plastic material at the center of the pulling line, the tube being covered with a woven covering of filamentary material constituting a fiber core of high tensile strength closely surrounding the tube. An abrasion-resistant braided cover is preferably provided over the exterior of the fiber core. The pulling line is preferably secured to the cable to be pulled by connecting means which includes a basket-type grip acting on the exterior of the pulling line, the opposite end of which basket-type grip is separated into individual parallel filamentary steel wires held in a wedge-type of connector. Preferably the spray nozzle means comprises a nozzle fitting in a nature of a spray head, which may also carry an integral eye for facilitating connection to the cable to be pulled, the spray head having an interior chamber communicating with the interior of the lubricant-supplying tube and also having feed channels extending from the interior chamber to the spray nozzles themselves located at the exterior and trailing end of the spray fitting.

In operation, a conduit line, or so-called mouse line, previously passed through the conduit in conventional manner, is attached to the eye at one end of the nozzle fitting and pulled through the conduit until the nozzle fitting, with the pulling line attached to it, exits from the feed end of the conduit. A swivel is then attached to the nozzle fitting eye in place of the conduit line, and the swivel secured to the cable to be pulled, preferably by way of a wedge-type connector. The pulling line is then pulled, preferably by a pulling winch, while at the same time a pump pumps lubricant through the interior of the tube in the pulling line and thence through the spray nozzles, thus spraying lubricant on the interior of the conduit just ahead of the cable as it is being pulled. When pulling is complete, the swivel is disconnected from both the pulling eye and the compression connector, and the connector removed from the end of the pulled cable.

BRIEF DESCRIPTION OF FIGURES

These and other objects and features of the invention will be more readily understood from a consideration of the following detailed description, taken in connection with the accompanying drawings, in which:

FIG. 1 is a schematic diagram showing a system using the subject invention just prior to pulling of the cable;

FIG. 2 is a similar schematic diagram showing the system when the cable pulling operation has started;

FIG. 3 is a side view of a portion of the lubricating and connecting means in accordance with a preferred form of the invention;

FIG. 4 is an enlarged sectional view taken along lines 4—4 of FIG. 3;

FIG. 5 is an enlarged side view of the pulling line;

Corresponding parts in the several drawings are indicated by corresponding numerals.

DETAILED DESCRIPTION OF SPECIFIC EMBODIMENTS

Figure 6:
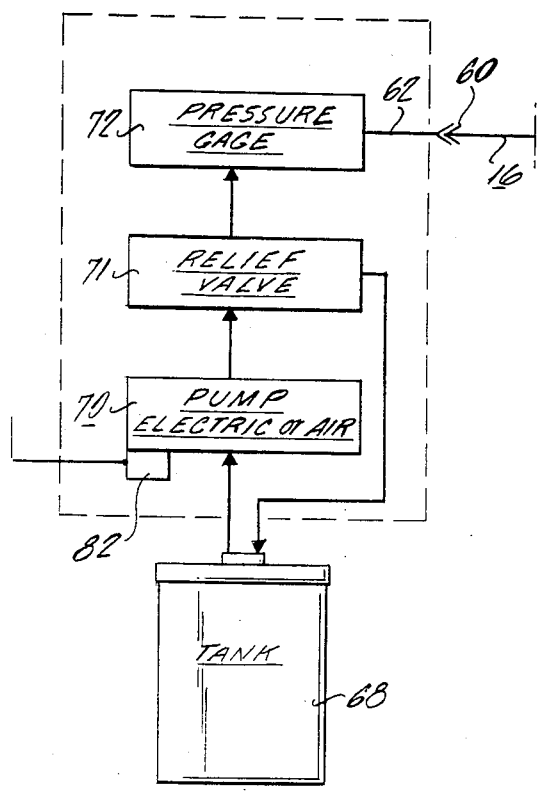
FIG. 6 is a schematic representation of the lubricant supply system.

Referring first to the system diagrams of FIGS. 1 and 2, there is shown schematically a conduit 10 through which an electrical cable 12 is to be pulled; that is, the forward end of the cable is to be pulled completely through the conduit so that it is accessible for making electrical connection to it, the remainder of the cable then extending along and through the conduit and out the opposite end.

In this example it is assumed that cable 12 is a harness type cable made up of smaller cables each joined to a single wedge-type pulling connector 14 like that shown in U.S. Pat. No. 4,123,133 of Wiley J. Pickett and Albert A. Boye filed June 6, 1977 and issued Oct. 31, 1978, although other types of cables and connectors may be pulled by the method and apparatus of the present invention. As shown schematically, the conduit 10 contains a number of bends which must be negotiated by the cable and connectors as they are pulled through the conduit.

In FIG. 1, the pulling line 16 has been unreeled from a storage reel 20 and pulled, by means of the mouse or conduit line 21, through the conduit to the position shown in FIG. 1. The conduit line is then disconnected.

In FIG. 2 the system is shown at the point in operation when the lead end of the cable 12 is beginning to be pulled through the conduit 10; this pulling is accomplished by securing to the eye 22 of the nozzle fitting a swivel 24 and shackles 26 and 28, the latter shackle being secured to and through the eye bolt 30 of the pulling head 32 of the cable harness to be pulled.

Spray nozzle fitting 40 is connected through a threaded sleeve 42 to a basket-type grip 44 by means of a modified form of wedge connector 48. The details of these connections are shown in FIGS. 3 and 4 and will be described more fully hereinafter.

The basket-type grip 44 extends over and, during pulling, seizes the exterior of, the trailing end of pulling line 16, which is pulled by the motorized winch 50 during the cable pulling operation. The pulling line 16 extends through a conduit adaptor 52, over appropriate sheaves 54 and 56, and several times around the winch 50; any excess of the line (which may be as much as 600 ft. or more in length) is accumulated by coiling the line on the floor. The remote end of the line 16 is provided with a pressure coupling 60 of the quick disconnect type, comprising an appropriately valved and pressurized commercial fitting through which lubricant is supplied to a tube which extends through the entire length of the pulling line 16 to the spray nozzle fitting 40. The quick-disconnect coupler connects to a lubricant-supply line 62, which extends from a source of pressurized lubricant on dolly 66.

More particularly, a storage tank 68 of an appropriate lubricant, such as an aqueous silicone oil emulsion, may be provided on dolly 66, along with a pump system 70 which, when turned on, delivers pressurized lubricant through the quick coupler 60 to the tube inside pulling line 16 and thence to the spray nozzle fitting 40. A conventional arrangement of a relief valve 71 and a pressure gauge 72 (see FIG. 6) may be provided in connection with the pump 70. The pump 70 and the motor 80 for the winch may have respective on-off switches 82 and 84; preferably these switches are so interconnected by electrical lines 85a,85b that whenever the motor for driving the winch is turned on, the pump will also thereby be automatically turned on also. This will assure that whenever the winch is pulling cable, the pump will be delivering lubricant to the spray nozzle fitting.

As indicated in FIG. 4, the spray nozzle head 40 is provided with a pair of spray nozzles 88 and 90 which serve to eject a spray outwardly against the interior of the conduit at a position preceding the cable 12, thereby lubricating the interior of the conduit just ahead of the cable to provide the desired well-lubricated, easy pulling action.

Before describing a typical use and operation of the equipment, some of the details of preferred forms of certain parts of the system will be now described with particular reference to FIGS. 3–5 and 7.

Figure 7:
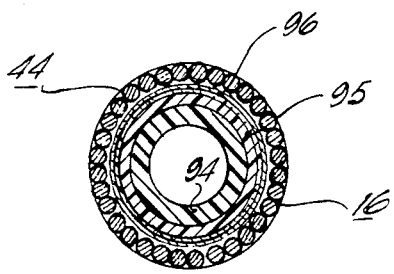
FIG. 7 is a cross-sectional view of the pulling line taken along lines 7—7 of FIG. 5.

Referring first to FIGS. 5 and 7 showing the nature of the pulling line 16, it will be seen to be made up of a central tube 94 (FIG. 7) of flexible plastic material. Over the exterior of the tube 94 is provided a fiber core 95 made up of filaments of a suitable material such as that known by the trademark Kevlar and manufactured by E. I. DuPont DeNemours, Inc. which provides high tensile strength for the pulling line; over the top of the fiber core there is disposed a polyester braid 96 providing high abrasion resistance and protection for the interior of the pulling line; a suitable material for this purpose is that known by the trademark Aracom, made by Yale Cordage Co. of Yarmouth, Me.

The pulling line 16 is sufficiently flexible to bend easily around the bends and convolutions experienced in the type of conduits through which the cable is to be pulled, with the central tube 94 remaining open during such bending so as to maintain the desired flow of lubricant to the spray nozzle fitting at all times.

To secure and grasp the pulling line 16, a wire basket-type grip 44 is preferably used which is held to the exterior of the pulling line at the leading end of the grip by means of a suitable clamping device 100; the trailing end of the grip is secured by cutting and bending the wires of the grip into a bundle containing six groups of four such wires, each group being held in a clip such as 101; the free ends of the bundle of wires are secured in a wedge-type connector 48 very similar to connector 32 described above. In this case the wires of the grip extend into the space between the internal wedge 102 (FIG. 4) and the conical internal surface 104 of the exterior shell 106 of the connector, while the central lubricant-providing tube 94 extends through the interior of the wedge 102. To protect the tube, it is preferable to provide a brass tubular fitting 108 around the portion thereof which extends within the wedge 102, so that when the connector is pulled to cause it to set and secure itself to the grip wires, the central tube in the pulling line is not in danger of harm.

The sleeve 42 (FIG. 4) has interior threads 110 engaged with corresponding threads on the exterior shell 106 of connector 48, and at its opposite end the sleeve 42 threadingly engages a protruding externally threaded portion 114 of the nozzle fitting 40. A central axial bore 116 is provided in fitting 40, into which a tubular insert 118 is threaded. The latter insert is rotatably captured on an internal axial sleeve 120 to provide a swivel action therewith; the latter internal sleeve is mounted in a threaded outer sleeve 122 which receives a threaded clamping nut 130. A short ferrule 132 fits around the end of internal sleeve 120, and the end of tube 94 is pushed into ferrule 132 and clamped tightly by clamping nut 130 to form a pressure seal. The end result is a transition assembly which provides a pressurized transition from the end of tube 94 to bore 116 in spray nozzle head 40.

As shown in FIG. 4, a pair of diametrically opposite channels 150,152 extend from bore 116 to respective nozzle wells 160,162, into which respective wells centrally-apertures spray nozzles 88 and 90 are threaded.

In the normal use of the system illustrated, a conduit line, or mouse line, which has previously been passed through the conduit 10 by known methods, is first secured to the eye 22 at the pulling end of the pulling line 16, and the conduit line pulled from the opposite end of the conduit to pull the pulling line through the conduit until eye 22 exits from the conduit. The cable to be pulled, on which the wedge-type compression connector 32 has previously been applied, is then connected to the eye 22 of the pulling line by means of the swivel and shackle arrangement shown in FIG. 3, and the winch motor turned on. This automatically also turns on the lubricant spray, and the pulling line then pulls the cable through the conduit, as desired, while providing thorough lubrication of the interior surface of the conduit just ahead of the cable as it passes through the conduit. When pulling is complete, the winch and pump are of course turned off and the various connectors to the cable are removed.

In this way efficient, tidy, relatively inexpensive, quick pulling of the cable is accomplished, without requiring excessively high pulling tensions and without danger to the conduit or cable.

As an example only, central tube 94 may be of nylon or PVC, the nozzle fitting 40 may be of high-density manganese bronze, and the lubricant may be an aqueous emulsion of silicone oil delivered onto the conduit at a rate of about 0.5 gallons of lubricant per hour, at a pressure of about 90 lbs. psi; if the cable is pulled faster than about 15' per minute, spray nozzles can be substituted which will easily deliver up to 3.5 gallons per hour, for example, as needed for the particular application.

While the invention has been described with particular reference to specific embodiments thereof, in the interest of complete definiteness, it will be understood that it may be embodied in a variety of forms diverse from those specifically shown and described, without departing from the spirit and scope of the invention as defined by the appended claims.

We claim:

1. The method of pulling a cable through a conduit, which comprises:

fastening said cable to one end of a hollow high-tensile strength pulling line by way of a pulling connection secured to said pulling line, mounting a lubricant spray head adjacent said pulling connection to move with said cable as it is pulled through said conduit, and supplying lubricant under pressure to said spray head by way of a flexible lubricant-supply tube inside said hollow pulling line and connected at one end to said spray head to effect spraying of the interior of said conduit with said lubricant as said spray head is pulled through said conduit, said lubricant-supply tube having a percentage elongation many times greater than that of said pulling line, the tension due to said pulling being applied to said pulling line to the substantial exclusion of said lubricant-supply line.

2. Cable pulling apparatus for pulling an object through a conduit, comprising:

a hollow pulling line having high tensile strength along the direction of its length and having low percentage elongation, for pulling said object through said conduit;

connecting means operatively connecting one end of said pulling line to said object to permit said pulling thereof;

fluid-lubricant dispensing means secured to said connecting means and responsive to fluid lubricant supplied thereto to dispense said lubricant against the adjacent interior walls of said conduit as it is pulled through said conduit; and a flexible lubricant-supply tube extending through the length of the interior of said pulling line and connected to said fluid-lubricant dispensing means for delivering fluid lubricant under pressure to said dispensing means during said pulling, said tube having a percentage elongation many times greater than that of said pulling line.

3. The apparatus of claim 2, wherein said dispensing means is a part of said connecting means, and said pulling line is operatively connected to said dispensing means through a basket-type grip acting on the outside of said pulling line.

* * * * *